J. W. RENO.
TRUCK CONVEYER.
APPLICATION FILED MAR. 14, 1914.
1,170,332.
Patented Feb. 1, 1916.
2 SHEETS—SHEET 2.
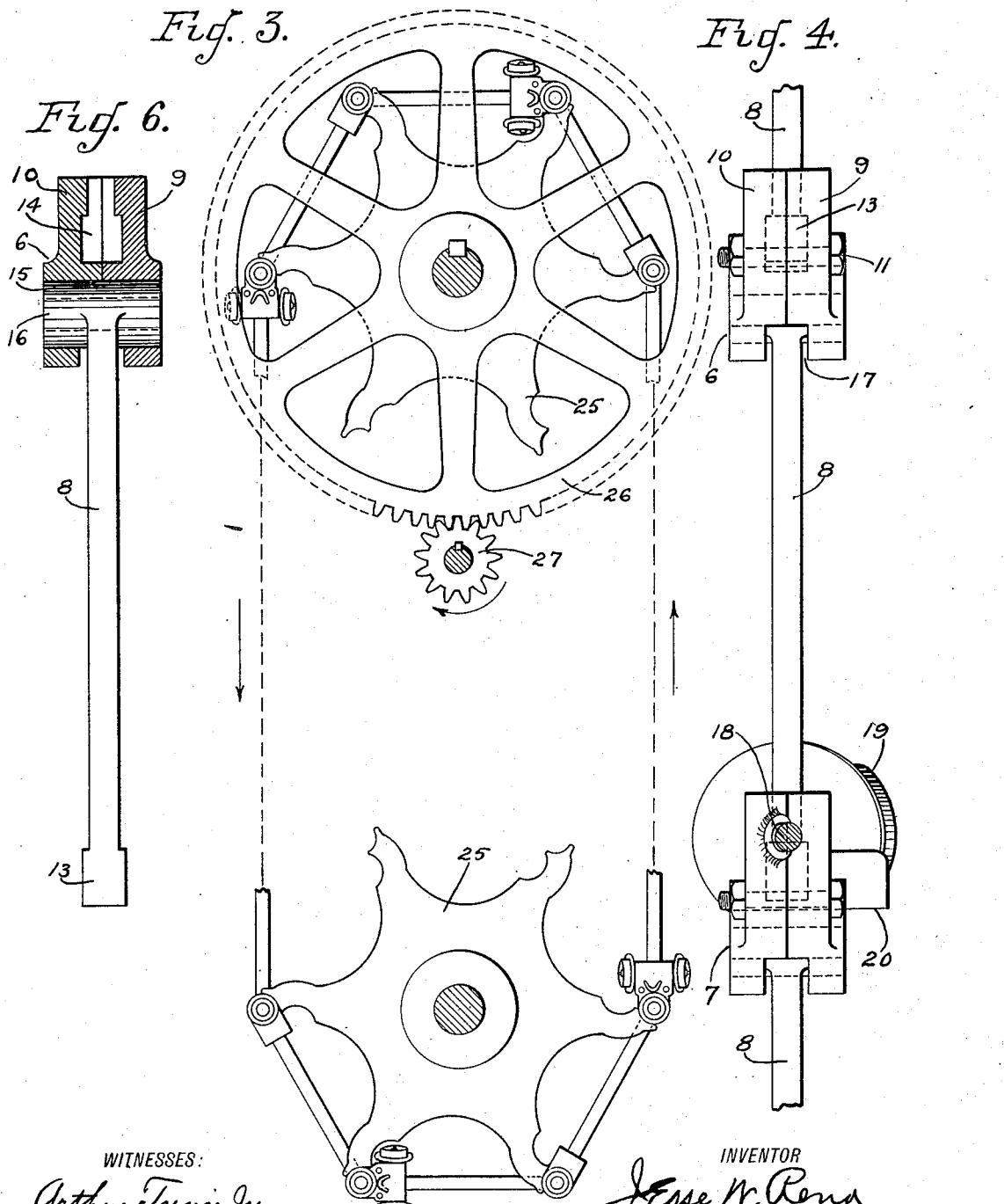
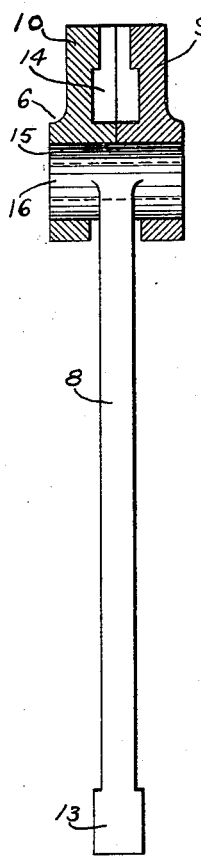
WITNESSES:
Arthur Trigie Jr.
James L. Bethell.
INVENTOR
Jesse W. Reno
BY
L. H. Campbell
ATTORNEY

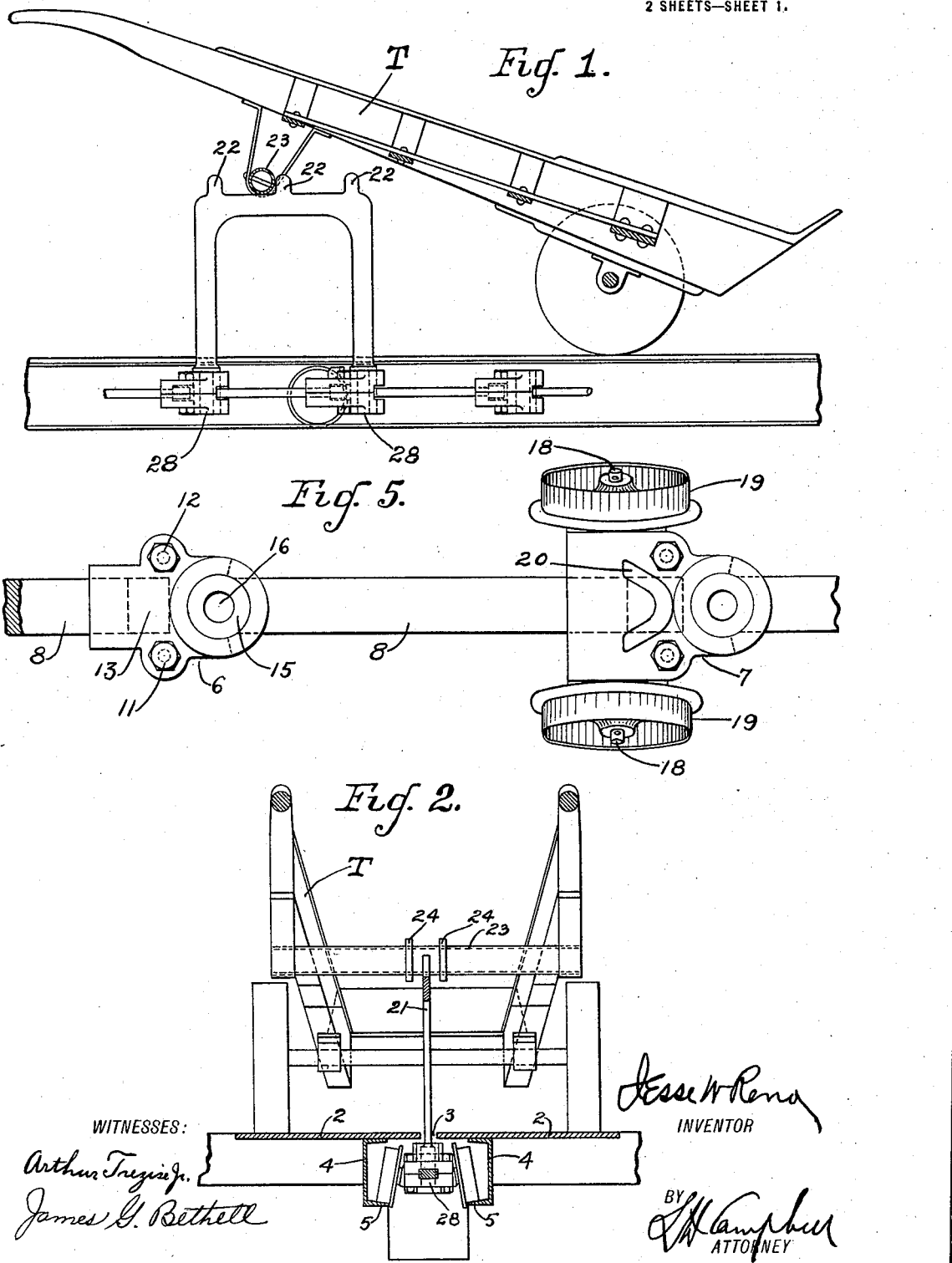

UNITED STATES PATENT OFFICE.

JESSE W. RENO, OF NEW YORK, N. Y., ASSIGNOR TO OTIS ELEVATOR COMPANY, OF JERSEY CITY, NEW JERSEY, A CORPORATION OF NEW JERSEY.

TRUCK-CONVEYER.

1,170,332.

Specification of Letters Patent.

Patented Feb. 1, 1916.

Application filed March 14, 1914. Serial No. 824,619.

*To all whom it may concern:*

Be it known that I, JESSE W. RENO, a citizen of the United States, residing in New York, in the county of New York and State of New York, have invented a new and useful Improvement in Truck-Conveyers, of which the following is a specification.

My invention relates to conveyers, and is particularly directed to a conveyer for use in transporting two wheeled trucks in a horizontal plane.

One object of the invention is the provision of a simple practical and efficient mechanism for conveying trucks along the floors of docks, warehouses and similar places, and for maintaining the truck when being conveyed in an advantageous position with the truck handles elevated, so as to make it unnecessary for the truckman to stoop down to raise or lower the handles of a heavily loaded truck every time the truck is moved on or off the conveyer.

Another object of my invention is the provision of a vertical support for engaging and supporting the truck while being hauled which support may be instantly detached from the hauling chain and removed so as to leave the surface of the dock or warehouse floor clear.

A further object of my invention is the provision of a novel form of conveyer or hauling chain and the manner in which the chain is supported and guided.

Other objects of the invention will appear hereinafter, the novel combinations of elements being pointed out in the appended claims.

In the accompanying drawings, Figure 1 is an elevation view of a portion of the conveyer showing its mode of operation; Fig. 2 is an end section view of Fig. 1; Fig. 3 is a plan view showing a method for driving the conveyer chain; Figs. 4 and 5 are elevation and plan views, respectively, of the chain links; Fig. 6 is a detail side view in part section of one of the connecting links.

Like reference characters denote similar parts in all of the figures.

Referring to Figs. 1 and 2, the numeral 1 designates the floor of a dock or warehouse to which are secured a pair of metal floor plates 2, 2, spaced apart in order to leave a narrow opening or slot 3. A pair of channels 4, 4, are bolted to the under side of the floor plates so as to form a conduit; the lower flange 5, 5, of each channel forming a track surface upon which the guiding and supporting wheels of the conveyer chain run. The conveyer chain moves within the conduit formed by the channels 4, 4, and is preferably of that general type known as "monobar" chains, comprising a plurality of sockets and connecting links of bar stock. The particular type of chain which I propose to employ substantially differs from that in present day use and comprises a plurality of sockets such as 6 and 7 (see Figs. 4, 5 and 6) which are connected together by links 8. The sockets 6 and 7 are similar to each other in many respects, and each socket such as the socket 6, is made in two similar halves 9 and 10 fastened together by the bolts 11 and 12. The links 8 are all alike and are provided at one end with a circular knuckle 15 having a hole 16 through its center and at the other end with a squared or enlarged portion 13. The portion 13 is embraced in a corresponding recess 14 toward one end of the socket, while the knuckle 15 on the other end of the link lies in a cylindrical recess bored in the other end of the socket. A slot 17 is provided in the socket so as to permit the link to swivel therein as the chain is deflected from a straight line position. By reason of forming the sockets in two halves it is a very simple matter to remove any of the parts of the chain for repairs or replacement by merely removing the bolts 11 and 12.

The socket 7 answers the description just given with respect to the socket 6, but the same is made somewhat heavier and is provided with axles 18, 18, which are inclined to each other and each axle carries a flanged track wheel 19 adapted to roll on the channel flanges 5, 5. The top of this socket is provided with a lug 20 which is preferably V-shaped in form and extends up from the socket in proximity to the floor plates 2, 2, of Figs. 1 and 2, and may be utilized for hauling a truck or other wheeled vehicle when the latter is provided with a lug arranged to enter the conduit slot 3, such for instance as is shown in Patent No. 974,918, issued to me on November 8, 1910, for truck conveyer. Owing to the V-shape of the lug 20, the co-acting truck lug will automatically center itself in the slot 3 and consequently will not rub against the sides of the slot. If desired all of the chain sockets may be provided with wheels such as the socket 7, but in the majority of cases I prefer that only every other socket be provided with wheels so as to lessen the cost of construction and to economize in weight and material. Where unusually heavy loads are to be handled it becomes desirable to provide each and every socket with wheels, but usually it will be sufficient to have every other or every third socket provided with wheels.

The conveyer chain, as shown, is adapted to lie in a horizontal plane, so that by means of but a single chain trucks may be hauled in either direction. The chain may be operated in any of the well known ways such for instance as is disclosed in Fig. 3. In this figure, 25 25, represent the sprocket wheels which engage and drive the chain; power being applied to the pinion 27 meshing with a gear 26 operatively connected to one of the sprocket wheels 25.

An important part of my invention resides in the use of one or more detachable frames or truck carriers 21 which extend through the conduit slot 3, and coöperate with the conveyer chain and a truck T. The frames 21 are preferably made of comparatively thin steel so as to be light in weight, and the lower part is provided with a pair of shanks or pins 28, 28, which fit loosely into the circular holes 16, 16, of adjacent chain knuckles. By reason of this construction, the truck carriers may easily be placed in operative position or quickly removed by simply drawing them up through the conduit slot, so that at such points where the conveyer extends across a roadway or thoroughfare, the carriers may be removed when not in use. The top of each carrier may be provided with projections 22, 22, for engaging some part of the truck, such for instance as a bar or piece of pipe 23, which may be secured to the feet of the truck and provided with fixed collars 24, 24, for preventing the truck from shifting sidewise while being conveyed. The carriers 21, of which any number may be used, are intended to be of such height as to maintain the handles of the truck in substantially the same position as when the truck is being hauled by the truckman. By reason of this arrangement I obviate the necessity for the truckman to stoop down each time a truck is attached, or detached from, the conveyer, and hence a substantial saving of labor on the part of the truckman is effected.

While I have disclosed a preferred embodiment of my invention, I desire not to be limited to the precise arrangement and construction of parts set forth, since it is obvious that one skilled in the art could readily make changes and modifications therein without departing from the spirit and scope of my invention.

What I claim is:—

1. In a truck conveyer, the combination with a conveyer chain, of a carrier movable with said chain and adapted to engage and support one end of a truck.

2. In a truck conveyer, the combination with a conveyer chain, of a carrier movable with said chain and adapted to engage and support the forward end of a truck.

3. In a truck conveyer, the combination with a conveyer chain, of a detachable carrier movable with said chain and adapted to engage a truck.

4. In a truck conveyer, the combination with a conveyer chain, of a detachable carrier movable with said chain and adapted both to support one end of a truck and to haul said truck.

5. In a truck conveyer, the combination with a floor having a channel or groove formed therein, of plates secured to the floor above said channel and separated by a space forming a relatively narrow slot, a conveyer chain movable in said channel, and a detachable carrier extending through said slot and engaging said chain.

6. In a truck conveyer, the combination with a floor having a channel or groove formed therein, of plates secured to the floor above said channel and separated by a space forming a relatively narrow slot, a conveyer chain movable in said channel, and a truck engaging carrier extending through said slot and supported by said chain, said carrier being of less width than that of the said slot so as to permit of its removal therefrom.

7. In a truck conveyer, the combination with a floor having a groove therein, of plates secured to said floor above the groove and separated by a space forming a relatively narrow slot, a conveyer chain movable in said groove, channel beams secured to the under side of said plates on either side of said slot, and wheels on said chain adapted to track on the flanges of said channel beams.

8. In a truck conveyer, the combination with a floor having a groove therein, of plates secured to said floor above the groove and separated by a space forming a relatively narrow slot, a conveyer chain movable in said groove, channel beams secured to the under side of said plates on either side of said slot, and a pair of wheels carried on opposite sides of the chain, said wheels being inclined or dished so as properly to track on the opposite flanges of said channel beams.

9. In a truck conveyer, the combination with a floor of a conduit under the floor, a conveyer chain movable in said conduit, a pair of channel beams secured under the floor adjacent each other, and inclined wheels carried upon opposite sides of the chain adapted to track on the flanges of said channel beams.

10. In a truck conveyer, the combination with a floor, of a conduit under the floor, a conveyer chain movable in said conduit, a pair of channel beams secured under the floor adjacent each other, inclined wheels carried upon opposite sides of the chain adapted to track on the flanges of said channel beams, and a truck engaging member movable with said chain and extending above the said floor.

11. In a truck conveyer, the combination with a floor, a conveyer chain comprising a plurality of connected links, a conduit under the floor in which said chain moves, and a carrier engaging alternate links in said conveyer chain and extending above the floor.

12. In a truck conveyer, the combination with a floor, a conveyer chain comprising a plurality of connected links, a vertical hole in each link, a conduit under the floor in which said chain is adapted to move, a carrier extending above the floor, and shanks or pins on said carrier adapted to enter the holes in said links.

In testimony whereof, I have signed my name to this specification in the presence of two subscribing witnesses.

JESSE W. RENO.

Witnesses:
WALTER C. STRANG,
EDGAR W. SMITH.

Copies of this patent may be obtained for five cents each, by addressing the "Commissioner of Patents, Washington, D. C."